United States Patent

Roush et al.

[11] Patent Number: 6,114,629
[45] Date of Patent: Sep. 5, 2000

[54] GROMMET HAVING METAL INSERT

[75] Inventors: Robert A. Roush, Norwich, Conn.; David L. Bartlett, Springville, Ind.; William T. Young, Jr., Cheseapeake, Va.; Austin H. Wolfe, New London, Conn.

[73] Assignee: The United States of America as represented by the Secretary of the Navy, Washington, D.C.

[21] Appl. No.: 09/162,633

[22] Filed: Sep. 28, 1998

[51] Int. Cl.[7] .................................................. H02G 3/18
[52] U.S. Cl. ................. 174/65 G; 174/65 R; 174/65 SS; 174/65 G; 174/135; 16/2.1; 16/2.2; 248/56; 439/274; 439/587
[58] Field of Search ............................. 174/65 R, 65 SS, 174/65 G, 135, 152 G, 153 G, 64, 151; 439/274, 275, 587; 16/2.1, 2.2; 248/56

[56] References Cited

U.S. PATENT DOCUMENTS

| 2,424,757 | 7/1947 | Klumpp, Jr. ...................... 174/153 G |
| 4,901,395 | 2/1990 | Semrau . |
| 5,531,459 | 7/1996 | Fukuda et al. ........................... 277/178 |
| 5,811,728 | 9/1998 | Maeda .................................... 174/65 R |
| 5,836,048 | 11/1998 | Rossman et al. .......................... 16/2.2 |

FOREIGN PATENT DOCUMENTS

| 2624664 | 6/1989 | France ................................... 174/135 |
| 2269945 | 2/1994 | United Kingdom .................. 174/65 G |

*Primary Examiner*—Kristine Kincaid
*Assistant Examiner*—Dhiru R Patel
*Attorney, Agent, or Firm*—Michael J. McGowan; Prithvi C. Lall; Michael F. Oglo

[57] ABSTRACT

The invention is directed to a grommet including a cylindrical body fabricated from rubber or synthetic rubber material. The body has a centrally located aperture extending therethrough and at least one radially located aperture with a slit for easily receiving a cable or the like. The grommet further includes a rigid insert secured to the body in the centrally located aperture. The insert has female threads formed therein for releasably securing a tool thereto to remove the grommet from the ballast tank without destroying the body of the grommet. The insert has a tubular member and an outwardly projecting circumferential flange formed on the tubular member. The body is formed on the tubular member wherein the flange secures the insert axially with respect to the body. Preferably, the body is fabricated from neoprene and is vulcanized to its final form.

7 Claims, 2 Drawing Sheets

6,114,629

GROMMET HAVING METAL INSERT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates generally to grommets, and more particularly to an improved grommet which is used in a ballast tank of an underwater vessel.

(2) Description of the Prior Art

FIGS. 1 and 2 illustrate a grommet 10 that is presently used in ballast tanks for underwater vessels. As shown, the grommet 10 includes a cylindrical body fabricated from rubber or synthetic rubber. The body includes a number of co-axially disposed openings formed therein which receive cables, wires, or the like. In order to remove an installed grommet, it must be pried with a knife or other sharp instrument from the surface on which it is sealed. This removal technique is extremely time consuming and tedious. In addition, the cables or wires are at risk of becoming damaged if the person removing the grommet is not careful in manipulating the knife.

The present invention is designed to overcome the disadvantages described above associated with standard grommets.

SUMMARY OF THE INVENTION

The instant invention is directed to a grommet comprising a cylindrical body fabricated from rubber or synthetic rubber material. The body has a centrally located aperture extending therethrough and at least one radially located aperture with a slit for easily receiving a cable or the like. The grommet further comprises a rigid insert secured to the body in the centrally located aperture. The insert has means for releasably securing a tool thereto to remove the grommet from the ballast tank without destroying the body of the grommet.

More specifically, the insert has a tubular member and an outwardly projecting circumferential flange formed on the tubular member. The body is formed on the tubular member wherein the flange secures the insert axially with respect to the body. The means for releasably securing a tool to the insert comprises female threads formed on an inner surface of the cylindrical member. Preferably, the body is fabricated from neoprene and is vulcanized to its final form.

Accordingly, it is a primary object of the present invention to provide an improved grommet with a metal insert that enables the grommet to be easily and quickly removed with a tool and without risk of damaging cables or wires secured to the grommet.

BRIEF DESCRIPTION OF THE DRAWINGS

A more complete understanding of the invention and many of the attendant advantages thereto will be readily appreciated as the same become better understood by reference to the following detailed description when considered in conjunction with the accompanying drawings wherein.

DESCRIPTION OF THE PREFERRED EMBODIMENTS

Figure 1:
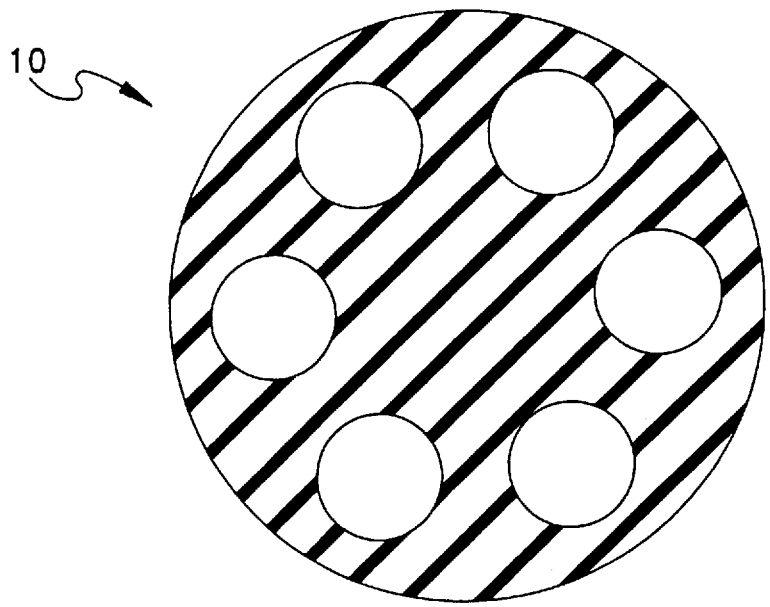
FIG. 1 is a top cross-sectional view of a prior art grommet used in ballast tanks.
Figure 2:
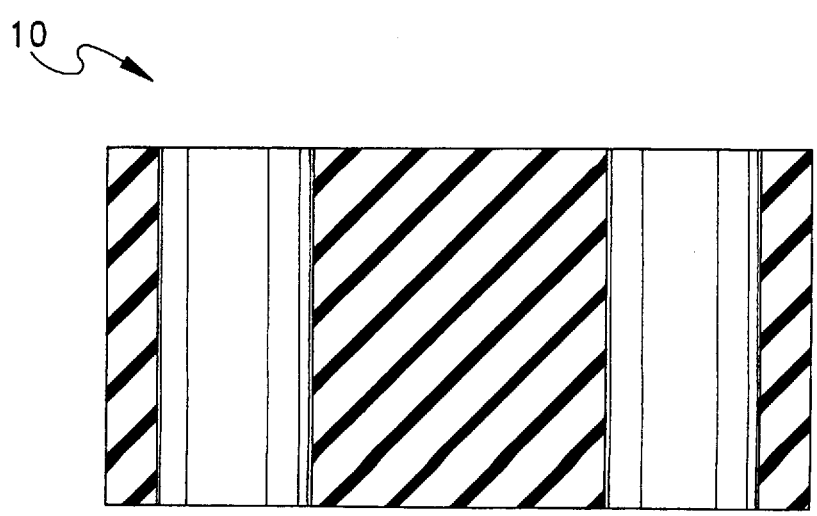
FIG. 2 is an elevational cross-sectional view of the grommet illustrated in FIG. 1.
Figure 3:
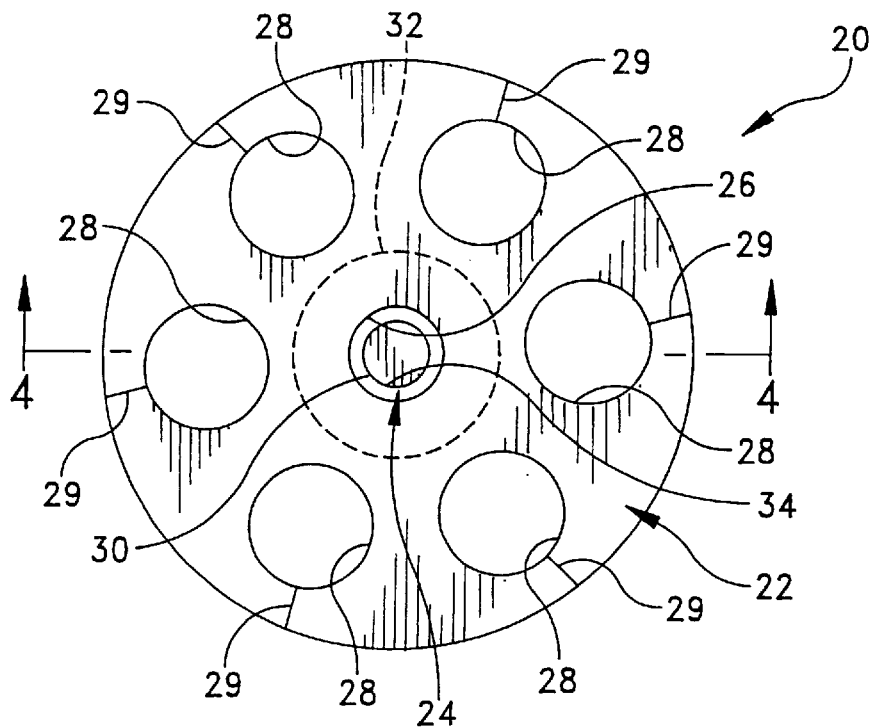
FIG. 3 is a top plan view of a grommet of the present invention.
Figure 4:
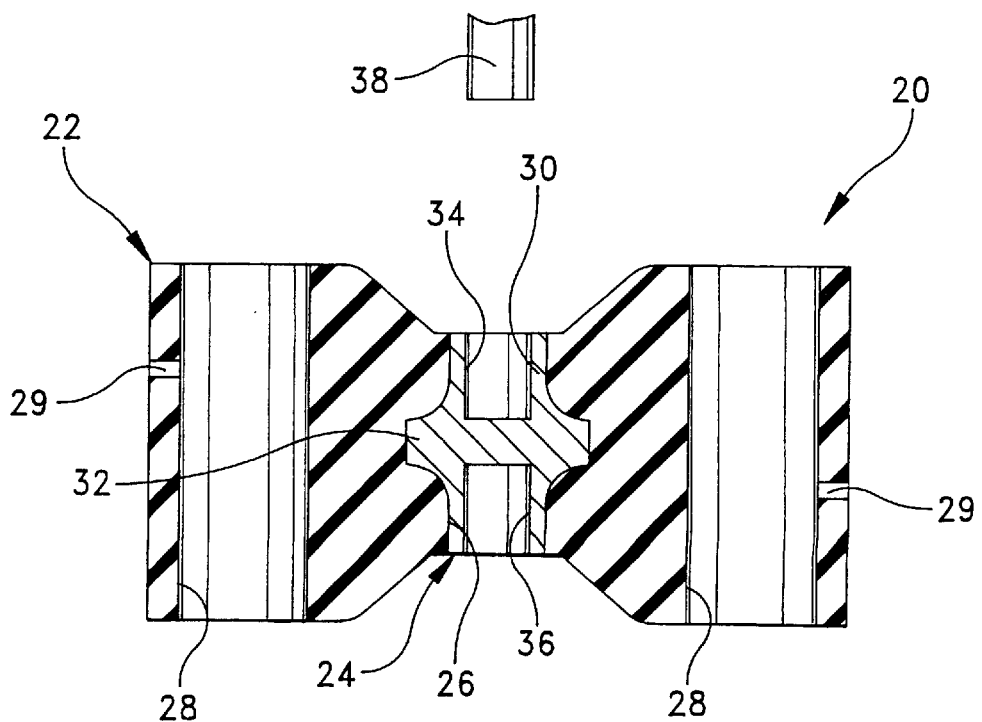
FIG. 4 is a cross-sectional view of the grommet taken along line 4—4 in FIG. 3.

Referring now to the drawing figures, and more particularly FIGS. 3 and 4, there is generally indicated at 20 a grommet of the present invention that is designed to replace the grommet 10 illustrated in FIGS. 1 and 2. As shown, the grommet includes a cylindrical body, generally indicated at 22, and a rigid insert, generally indicated at 24. Preferably, the body 22 is fabricated from rubber or synthetic rubber material (e.g., neoprene) so that it can perform its functions of supporting and protecting cables, wires, or the like (not shown). The body 22 includes a centrally located aperture 26 that extends coaxially through the body 22, along with a plurality (e.g., six) radially located apertures, each indicated at 28 and having a slit 29, for easily receiving the cables or wires therein. The body 22 is similar to the body of the grommet 10 except for the provision of the centrally located aperture 26.

Still referring to FIGS. 3 and 4, and in particular FIG. 4, the rigid insert 24 is preferably fabricated from metal that is resistant to corrosion (e.g., stainless steel, galvanized steel, etc.) The insert 24 includes a tubular member 30 and an outwardly projecting circumferential flange 32 formed on the tubular member 30. As shown, the body 22 is formed on the tubular member 30 in such a manner that the flange 32 secures the insert 24 axially with respect to the body 22. Preferably, the body 22 is vulcanized after being molded around the insert 24 for ensuring the securement of the body 22 thereto.

The tubular member 30 has an upper inner surface 34 disposed above the flange 32 and a lower inner surface 36 disposed below the flange 32. These surfaces 34, 36 are threaded (female threads) so that the end of a tool 38 having male threads matching female threads of either upper inner surface 34 or those of lower inner surface 36 can engage the insert 24 for axially removing the grommet 20 from the ballast tank. As shown in FIG. 4, the tool can be threadably secured to the insert 24 with the threads of either the upper inner surface 34 or the lower inner surface 36, if exposed, for positively engaging the insert and quickly and efficiently removing the grommet 20 in an axial direction.

It should be observed that the grommet 20 of the present invention is especially designed to be removed from the ballast tank without risking its damage. Accordingly, for these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A grommet comprising:
   a cylindrical body fabricated from rubber or synthetic rubber material, said body having a centrally located aperture extending therethrough and at least one radially located aperture with a slit for easily receiving a cable; and
   a rigid insert secured to the body in the centrally located aperture, said insert having means for releasably securing a tool thereto to remove the grommet from a ballast ballast tank without destroying the body of the grommet.

2. A grommet as set forth in claim 1, said insert having a tubular member and an outwardly projecting circumferential flange formed on the tubular member, said body being formed on the tubular member wherein said flange secures the insert axially with respect to the body.

3. A grommet as set forth in claim 2, said body being fabricated from neoprene.

4. A grommet as set forth in claim 3, said body being vulcanized.

5. A grommet as set forth in claim 2, said means for releasably securing a tool having matching male threads to the insert comprising matching female threads formed on an inner surface of the tubular member.

6. A grommet as set forth in claim 5 wherein said tubular member has an upper surface having matching female threads to engage said tool having matching male threads.

7. A grommet as set forth in claim 5 wherein said tubular member has a lower surface having matching female threads to engage said tool having matching male threads.

* * * * *